Dec. 11, 1956  W. W. RIEDEL  2,774,001
MOTOR STATOR LAMINATIONS AND METHOD OF
MANUFACTURING WELDED STATORS
Filed March 2, 1954  2 Sheets-Sheet 1

INVENTOR.
Walter W. Riedel
BY
Craig V. Morton
Attorney

Dec. 11, 1956 W. W. RIEDEL 2,774,001
MOTOR STATOR LAMINATIONS AND METHOD OF
MANUFACTURING WELDED STATORS
Filed March 2, 1954 2 Sheets-Sheet 2

INVENTOR.
Walter W. Riedel
BY Craig V. Morton
Attorney

United States Patent Office 2,774,001
Patented Dec. 11, 1956

2,774,001

MOTOR STATOR LAMINATIONS AND METHOD OF MANUFACTURING WELDED STATORS

Walter W. Riedel, Dayton, Ohio, assignor to General Motors Corporation, Detroit, Mich., a corporation of Delaware Application March 2, 1954, Serial No. 413,531

5 Claims. (Cl. 310—217)

This invention relates to improvements in laminated core constructions for dynamo-electric machines, and particularly relates to an improved laminated core construction for the stator of a dynamo-electric machine.

An object of the invention is to provide an improved laminated core construction wherein the laminations of the core are welded together to form a permanent assembly.

It is another object of the invention to provide an improved laminated core construction in accordance with the foregoing object wherein welding tabs are provided on the laminations of the laminated core in a manner that the weld occurring on the tabs will not project beyond the diameter of the laminations and the core assembled therefrom.

It is another object of the invention to provide a method of manufacture of lamina for a laminated core wherein welding tabs are provided on the lamina and the lamina are severed from a metal sheet in a manner to most conservatively use the metal of the sheet, the tabs for the lamina being obtained from an area of the metal sheet within overlapping diameters of an adjacent lamina.

Further objects and advantages of the present invention will be apparent from the following description, reference being had to the accompanying drawings wherein a preferred form of the invention is clearly shown.

In this invention the features thereof are shown in connection with a laminated core for the stationary member of a dynamo-electric machine which includes an assembly of a plurality of laminations 10 formed of magnetic material and having a plurality of winding slots 11 formed in one edge thereof. The lamina 10 are assembled in face to face engagement, shown in Figure 3, whereby the plural stacking of the lamina forms a stator core for a dynamo-electric machine.

Figure 1:
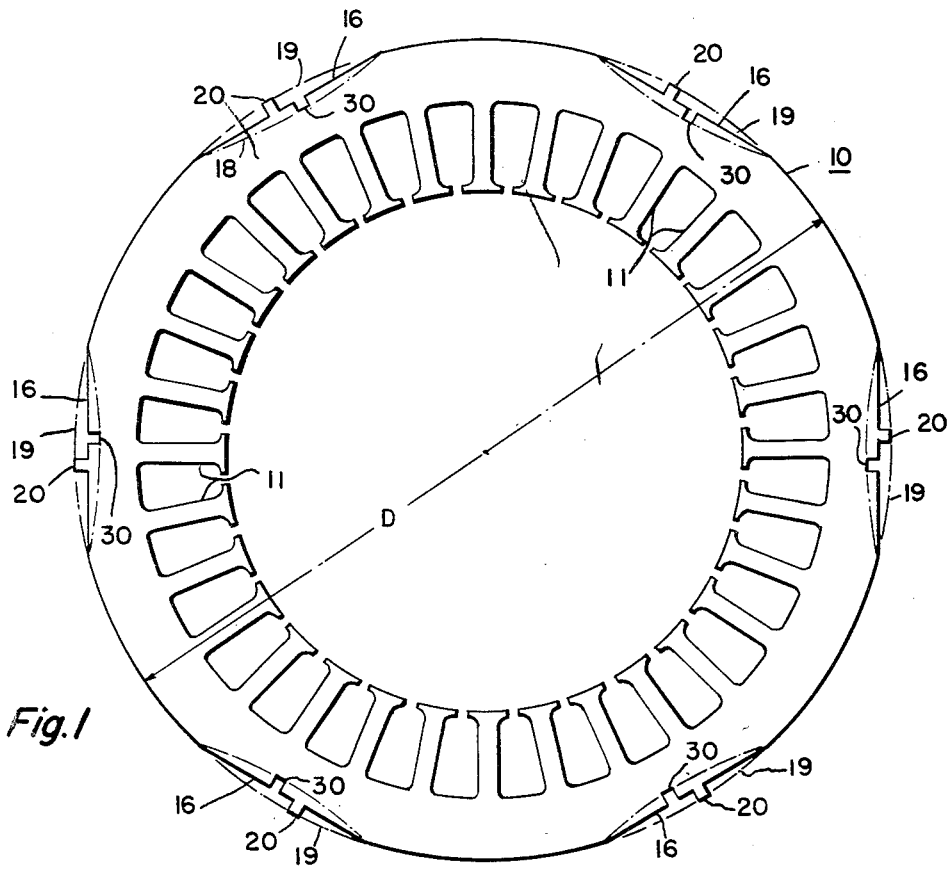
Figure 1 is an elevational view of a core lamina incorporating features of this invention.

The core has a diameter "D," as shown in Figure 1, this being the maximum peripheral dimension of the lamina 10 that composes the laminated core 15.

Each of the lamina 10 are provided with a plurality of chordal edges 16 spaced equidistantly around the periphery of the lamina 10. When the lamina are assembled in face engagement, as shown in Figure 3, the chordal edges 16 of the respective lamina are aligned in a planar condition to form a chordal area 17 on the core 15.

Figures 2, 3:
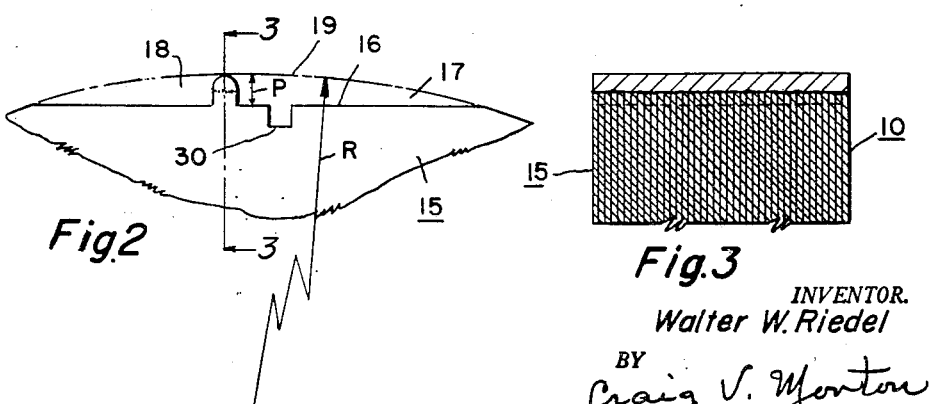
Figure 2 is an enlarged elevational view of a portion of a welded core assembly.
Figure 3 is a cross sectional view taken along line 3—3 of Figure 2.

As shown in Figures 1 and 2, the chordal edges 16, on the chordal area 17, form a segment of a circle 18 of which the arc 19 is a continuation of the diameter "D" of the lamina.

Each of the chordal edges 16 of the lamina 10 is provided with a tooth or tab 20 that projects radially outwardly of the lamina. This tab or tooth 20 is confined within the segment 18, that is it has a height that is not greater than a perpendicular "P" between the chordal edge 16 and the arc 19 as taken on the radius "R" of the lamina.

Therefore, when the lamina are assembled in stack relationship into a core, as shown in Figure 3, a welding heat can be applied to the tabs 20 that now form a continuous ridge longitudinally of the core 15 to weld adjacent tabs together and thereby bond the lamina into a permanent core structure. Since the maximum height of the tabs or teeth 20 is less than the perpendicular "P" between the cord line 16 and the arc 19, the welding of the tabs will cause a decrease in their height so that at no time will the weld line along the ridge produced by the adjacent tabs extend beyond the maximum diameter "D" of the lamina.

In any machining operation required to smooth the peripheral surface of the core 15, or to diminish the same, the weld line effected on the tabs 20 will not be removed in such an operation since the weld line is below the maximum diameter of the lamina.

Each of the lamina 10 also has a slot 30 adjacent the tooth 20, the slot 30 being of comparable shape and contour with regard to the tooth 20. Thus the tooth 20 and the slot or notch 30 are positioned on opposite sides of the cord line 16 with the slot 30 extending into the body of the lamina 10.

The notch or slot 30 is that portion of the lamina 10 that forms a corresponding tab or tooth 20 for a lamina removed from the sheet adjacent thereto during the process of manufacture of the separate lamina.

Figure 4:
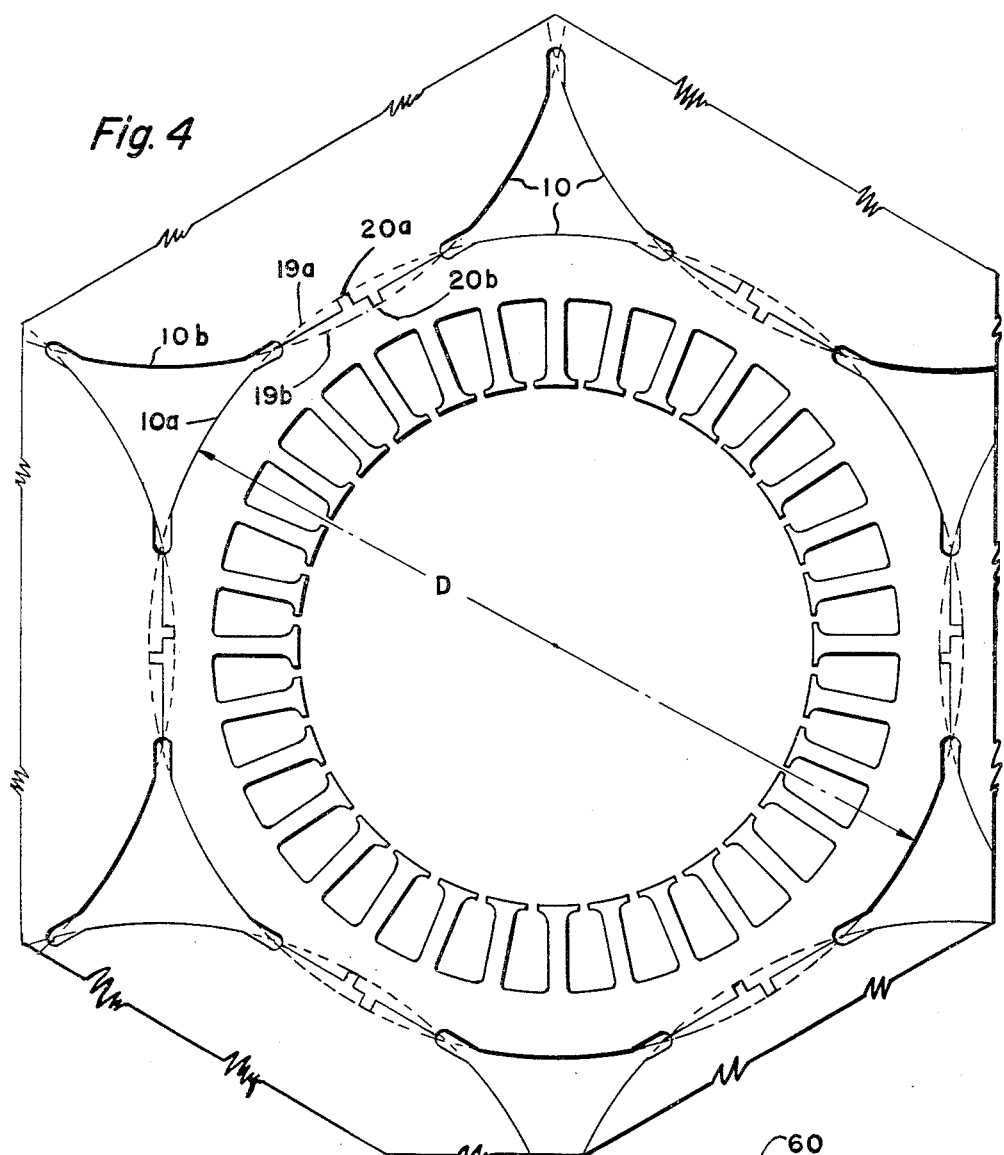
Figure 4 is an elevational view of the lamina arrangement by which they are severed from a metal sheet in the method of manufacturing the same.

As shown in Figure 4, in the step of manufacture of the several lamina 10, in severing the lamina from sheet stock, the diameter "D" of the lamina overlaps one another as shown by the arc lines 19a and 19b. The chordal edge 16 of the lamina forms a common chord between the arc lines 19a and 19b between the intersections of these arc lines effected by the overlapping of the diameters of the adjacent lamina. Thus, the lamina 10a has a tooth 20a that is removed from the portion of the lamina 10b between the common cord line 16 and the arc line 19a the cooperation of which forms the peripheral segment of the lamina 10a. The lamina 10b has a tooth or tab 20b that is removed correspondingly from the body of the lamina 10a. It will thus be seen that the tooth 20a forms the slot 30 of the lamina 10b while the tooth 20b forms the slot 30 of the lamina 10a upon severance of the adjacent lamina.

It will therefore be seen that the teeth 20a and 20b are each removed from the body of adjacent lamina but on opposite sides of the cord line 16 that bisects the segments formed by the arcs 19a and 19b of the overlapping diameters of the adjacent lamina 10a and 10b respectively.

The overlapping arrangement of the diameters of the adjacent lamina with severance along a common cord line thus effects a closer permissible spacing of lamina on a metal sheet and still provides for obtaining the tabs or teeth 20a and 20b without requiring additional peripheral dimension of the lamina, and further retains the teeth 20a and 20b within the periphery of the maximum diameter of the lamina.

In the method of manufacturing the individual lamina according to the arrangement of this invention a greater number of individual lamina are secured from a sheet of given width as well as of given length, thus providing a substantial saving in material.

Figure 5:
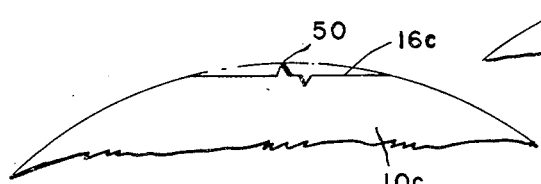
Figure 5 is an elevational view similar to Figure 4 but showing a modified form of welding tab.

In Figure 5 there is illustrated a modified arrangement of the tab or tooth that extends from the chordal edge portions of the lamina. As illustrated, the lamina 10c has a triangular shaped tooth 50 extending from the chordal edge portion 16c with the base of the triangular portion substantially on the line of the cord. Here also, the teeth of adjacent lamina are confined between the arcs of the overlapping diameters of the adjacent lamina 10c in the same manner as heretofore described with reference to Figure 4.

Figure 6:
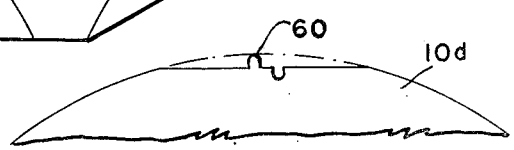
Figure 6 is a view similar to Figure 4 but showing still another modified form of welding tab.

In Figure 6 there is illustrated another modified form of tooth or tab wherein the lamina 10d are each provided with a tooth 60 that has a rounded end, the teeth 60 being confined within the arc of the overlapping diameters of the adjacent lamina.

While the form of embodiment of the invention as herein disclosed constitutes a preferred form, it is to be understood that other forms might be adopted as may come within the scope of the claims which follow.

What is claimed is as follows:

1. A dynamo-electric machine core member formed of generally circular laminations having winding slots in one edge and spaced chordal edge portions in the opposite edge thereof, a narrow tooth projecting from the chordal edge portions of each lamination of not greater height than a perpendicular on the cord on the radius of the lamination to the arc of the segment formed by the cord and a slot adjacent the tooth extending into the laminations from the chordal edge portions and forming with other teeth and slots of adjacent laminations in the core assembly a tooth ridge with a slot thereadjacent extending longitudinally parallel with the axis of the core over the chordal plane formed by the chordal edge portions of the core laminations, and a weld along the outer edge of the tooth ridge securing together said laminations.

2. A dynamo-electric machine core member in accordance with claim 1 in which the tooth and the slot are of comparable form.

3. A dynamo-electric machine core member in accordance with claim 1 in which the tooth and the slot are of comparable form with the tooth and the slot being equivalently disposed oppositely of the chord line on opposite sides of said perpendicular.

4. A lamina, for a dynamo-electric machine core member, having a generally circular form provided with spaced peripheral chordal edge portions each provided with a narrow tooth projecting from the chordal edge portions of not greater height than a perpendicular on the cord on the radius of the lamination to the arc of the segment formed by the cord, and a slot adjacent the tooth extending into the lamination from the chordal edge portion with the slot of comparable form to said tooth.

5. A lamina formed in accordance with the structure of claim 4 wherein said tooth and said slot are equivalently disposed oppositely of the chordal line upon opposite sides of the said perpendicular.

References Cited in the file of this patent

UNITED STATES PATENTS

| | | |
|---|---|---|
| 1,513,972 | Desloge | Nov. 4, 1924 |
| 1,754,466 | Hoskins | Apr. 15, 1930 |
| 2,251,926 | Erb | Aug. 12, 1941 |
| 2,448,785 | Dolan | Sept. 7, 1948 |